O. C. HOUGHTON.
MUD LUG FOR TRACTION ELEMENTS.
APPLICATION FILED AUG. 13, 1917.
1,258,683.
Patented Mar. 12, 1918.
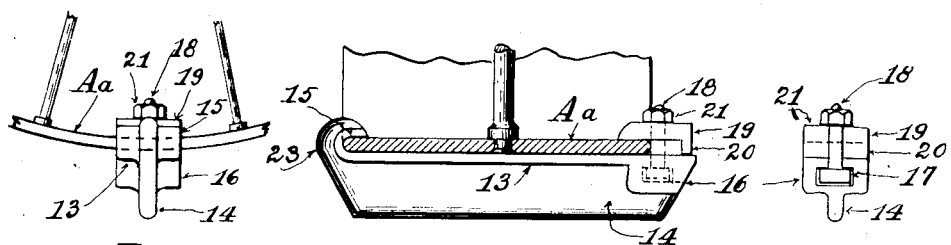
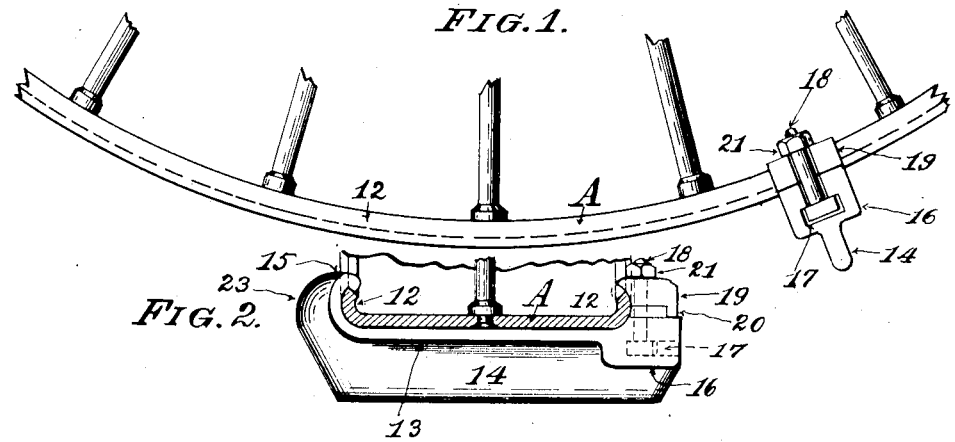
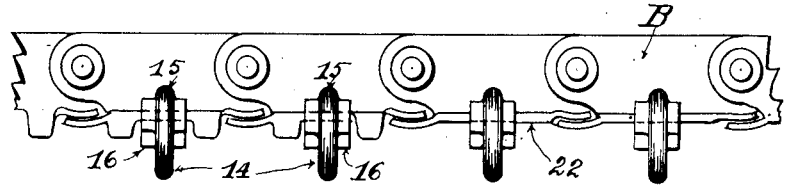
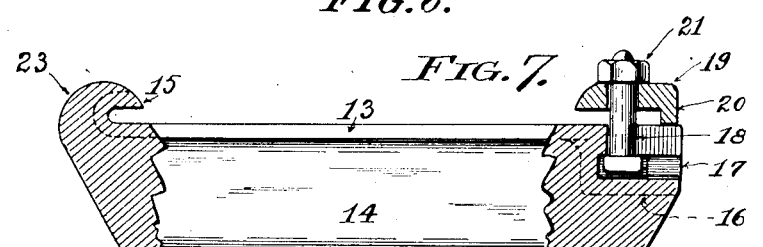
WITNESSES:
Al. Stark.
A. G. Peterson.
INVENTOR:
ORLEY C. HOUGHTON,
BY Michael J. Stark & Sons
ATTORNEYS.

UNITED STATES PATENT OFFICE.

ORLEY C. HOUGHTON, OF CHICAGO, ILLINOIS, ASSIGNOR TO FREDERICK C. AUSTIN, OF CHICAGO, ILLINOIS.

MUD-LUG FOR TRACTION ELEMENTS.

1,258,683.  Specification of Letters Patent.  Patented Mar. 12, 1918.

Application filed August 13, 1917. Serial No. 185,902.

*To all whom it may concern:*

Be it known that I, ORLEY C. HOUGHTON, a citizen of the United States, and a resident of the city of Chicago, in the county of Cook and State of Illinois, have invented a certain new and useful Improvement in Mud-Lugs for Traction Elements; and I do hereby declare that the following description of my said invention, taken in connection with the accompanying sheet of drawing, forms a full, clear, and exact specification, which will enable others skilled in the art to which it appertains to make and use the same.

My invention relates generally to improvements in mud lugs for traction elements; and it consists, essentially, in the novel and peculiar combination of parts and details of construction, as hereinafter first fully set forth and described and then pointed out in the claim.

The object of this invention is the production of an efficient, serviceable, and comparatively inexpensive mud lug for traction elements, such as traction wheels, endless track bands, and the like, one that can be readily applied and quickly removed when desired or necessary.

It is a well-known fact that mud lugs on tractor wheels, endless track bands, and the like are very desirable when the tractor is used on wet, soft, and marshy soil to facilitate adhesion of the traction wheel to the ground, but that they are very objectionable when the machine is employed on paved, macadamized, asphalt, or concrete roads, where the mud lugs cut up the road and readily destroy the same.

In order to attain the above-mentioned object, I construct this mud lug, in the preferred embodiment of my said invention, as shown in the drawings, forming a part of this specification, in which Figure 1 is a side elevation of a fragment of a traction wheel, showing one of my improved removable mud lugs in position, the margins of the tread or rim of the wheel being inwardly turned, as is frequently the case. Fig. 2 is a side elevation of the mud lug as applied to this rim, the rim being shown in section. Fig. 3 is a similar view showing the application of the mud lug to the rim of a wheel which does not have its marginal edges inwardly turned. Fig. 4 is a view of one end of the mud lug, and Fig. 5 is a like view of the opposite end thereof, the figure also showing the application of the mud lug to a straight-faced rim. Fig. 6 is a side elevation of a portion of an endless, or self-laying, tract band, to which a number of the mud lugs are attached. Fig. 7 is a side elevation on an enlarged scale, the figure being partly in section. Fig. 8 is a plan of the same.

Like parts are designated by the same characters and symbols of reference in all the various figures.

A, in the drawings designates the rim of a metallic traction wheel having the marginal edges 12, inwardly turned, as illustrated in Figs. 1 and 2; and A$^a$, Figs. 3 and 4, shows the rim perfectly straight, while B, in Fig. 6, shows a portion of an endless track band to which the removable mud lugs are attached.

These mud lugs are of substantially T-shaped cross section, comprising, each, a plate 13, formed preferably centrally, with a longitudinally disposed stem 14, which stem serves as the mud lug proper. This plate 13 has at one extremity a hook-shaped member 15, which is constructed to engage the rim of the wheel, and at its other end an enlargement 16, in which there is a T-slot 17, to receive the head and part of a bolt 18. Upon this end of the plate 13 there is located a clamping plate 19, provided with a toe 20, said plate 19 being perforated for the passage of the bolt 18, while a nut 21, on said bolt 18 serves to hold the clamping plate 19 securely to the rim of the traction element.

In order to place this mud lug onto the rim of the traction element, the clamping plate 19 and bolt 18 are moved and then the hook 15 caused to engage the rim of the traction element, at one margin thereof, then the bolt and clamping plate are applied to the other end of the device so that the clamping plate 19 engages the opposite margin of the traction element, when the nut 21, being screwed down, the mud lug is securely, but removably, fastened to the rim of the traction element.

In endless track bands, as illustrated in Fig. 6, there is always a tread or shoe 22, which is a more or less flat plate, and to this shoe 22, the mud lugs are secured in precisely the same manner as they are applied to the rim of a traction wheel.

Attention is now invited to the fact that these mud lugs are primarily intended for use on traction wheels which are not provided with mud lugs, or which have slightly projecting lugs either cast integrally with the rim of the wheel, or, as is frequently the case, riveted thereto. To provide such a wheel with mud lugs, or additional mud lugs of sufficient depth, it becomes necessary to provide the rim of the wheel with perforations to bolt the additional lugs to the rim, the bolts passing through the perforations. This construction is objectionable for the reason that the perforations add to the expense of the wheel, and weaken the same, while in case of an emergency the additional mud lugs cannot be immediately applied.

These objections are entirely overcome by my construction. My mud lugs can be instantly applied without any previous preparation of the traction element, and any desired number of mud lugs can be applied to, and removed from, the traction element on short notice.

It will now be noted that the stem 14 of the device extends upwardly over the hook 15, as indicated at 23, thereby forming a rib which reinforces the portion of the plate 13 which forms the hook 15, and thus materially strengthens the same.

The device described is comparatively simple and inexpensive, and fills a long-felt want.

I have hereinbefore described the preferred embodiment of my invention, but I desire it to be understood that minor details of construction shown or described, may be changed, and parts omitted without departing from the scope of my invention, as defined in the subjoined claim.

Having thus fully described this invention, I claim as new, and desire to secure by Letters Patent of the United States—

A removable mud lug for traction elements, including a plate, a hook-shaped member at one end of said plate, and a downwardly extending bar longitudinally disposed on said plate, said parts being integrally formed, said downwardly extending bar having at one end an enlargement, there being in said enlargement a T-slot, a bolt in said T-slot, and a clamping plate upon said first-named plate, and engaged by said bolt.

In testimony that I claim the foregoing as my invention, I have hereunto set my hand.

ORLEY C. HOUGHTON.